United States Patent
Cieslewski et al.

(10) Patent No.: US 9,654,035 B1
(45) Date of Patent: May 16, 2017

(54) HIGH-TEMPERATURE BRUSHLESS DC MOTOR CONTROLLER

(71) Applicant: Sandia Corporation, Albuquerque, NM (US)

(72) Inventors: Crzegorz Cieslewski, Sandia Park, NM (US); Scott C. Lindblom, Sandia Park, NM (US); Frank J. Maldonado, Albuquerque, NM (US); Michael Nathan Eckert, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 159 days.

(21) Appl. No.: 14/502,821

(22) Filed: Sep. 30, 2014

(51) Int. Cl.
| | |
|---|---|
| G05B 11/28 | (2006.01) |
| H02P 6/14 | (2016.01) |
| H02P 29/024 | (2016.01) |
| H02P 3/08 | (2006.01) |
| H02P 7/00 | (2016.01) |

(52) U.S. Cl.
CPC ............ H02P 6/14 (2013.01); H02P 3/08 (2013.01); H02P 7/00 (2013.01); H02P 29/024 (2013.01)

(58) Field of Classification Search
CPC ............ G02B 11/28; H02P 7/29; H02P 6/85
USPC ........ 318/599, 811, 459, 500, 461, 797, 801
See application file for complete search history.

(56) References Cited

U.S. PATENT DOCUMENTS

| | | | | | |
|---|---|---|---|---|---|
| 4,434,389 | A | * | 2/1984 | Langley | .................. H02K 3/28 318/400.41 |
| 5,014,793 | A | * | 5/1991 | Germanton | ............. B25B 21/00 173/181 |
| 5,434,487 | A | * | 7/1995 | Long | ........................ E05F 15/75 318/280 |
| 6,254,353 | B1 | * | 7/2001 | Polo | .................... F04D 15/0077 318/280 |
| 6,320,286 | B1 | * | 11/2001 | Ramarathnam | ........ H02K 11/33 310/47 |
| 6,388,353 | B1 | * | 5/2002 | Liu | ......................... F04B 13/00 310/114 |
| 6,804,130 | B2 | * | 10/2004 | Morimoto | ............ H02P 27/047 363/132 |
| 6,949,900 | B1 | * | 9/2005 | Berringer | .................. H02P 6/08 318/400.03 |
| 7,525,266 | B2 | * | 4/2009 | Bolusky | ................ H02P 29/032 318/265 |

(Continued)

OTHER PUBLICATIONS

Henfling, J.A. et al., "Development of a HT seismic monitoring tool for downhole." Innovative Technologies for an Efficient and Reliable Electricity Supply (CITRES), 2010 IEEE Conference. Sep. 27, 2014: 373-378.

*Primary Examiner* — Rina Duda
(74) *Attorney, Agent, or Firm* — Daniel J. Jenkins

(57) ABSTRACT

A motor control system for deployment in high temperature environments includes a controller; a first half-bridge circuit that includes a first high-side switching element and a first low-side switching element; a second half-bridge circuit that includes a second high-side switching element and a second low-side switching element; and a third half-bridge circuit that includes a third high-side switching element and a third; low-side switching element. The motor controller is arranged to apply a pulse width modulation (PWM) scheme to switch the first half-bridge circuit, second half-bridge circuit, and third half-bridge circuit to power a motor.

19 Claims, 5 Drawing Sheets

(56) References Cited

U.S. PATENT DOCUMENTS

| | | | |
|---|---|---|---|
| 2003/0178960 A1* | 9/2003 | Kassing | H02P 9/04 318/430 |
| 2008/0286131 A1* | 11/2008 | Yuratich | E21B 43/128 417/410.1 |
| 2010/0073189 A1* | 3/2010 | Mandal | G01V 11/002 340/853.3 |

* cited by examiner

HIGH-TEMPERATURE BRUSHLESS DC MOTOR CONTROLLER

STATEMENT CONCERNING FEDERALLY SPONSORED RESEARCH

This invention was developed under Contract DE-AC04-94AL85000 between Sandia Corporation and the United States Department of Energy. The U.S. Government has certain rights in this invention.

FIELD OF THE INVENTION

The present invention is directed to an electronic controller for a DC motor, and more particularly to a high-temperature motor controller capable of operation in harsh environments for downhole gas and oil drilling operations.

BACKGROUND OF THE INVENTION

High-temperature geothermal exploration and drilling operations require a wide array of tools and sensors suitable for instrumentation for monitoring downhole conditions. There are limited options for tools and components with the capability for high temperature drilling and monitoring.

Several downhole applications exist in which a small motor may be useful. Applications such as clamping systems for seismic monitoring, televiewers, valve actuators, and directional drilling systems may be able to utilize a robust motor controller capable of operating in harsh environments.

Current motor controllers are capable of operating up to 125° C. The development of a high-temperature motor controller capable of operation at temperatures greater than 125° C. and up to 230° C. would significantly increase the operating envelope for next generation high temperature tools and provide a useful component for downhole systems. Recently as motors capable of operating in very high-temperature regimes are becoming commercially available, but motor controls are not available for application in such environments. One method of deploying a motor controller is to use a heat shielded tool and apply low-temperature electronics to control the motor. This method limits the amount of time that controller tool can function in high-temperature environments and does not allow for long-term deployments. Heat shielded tools may be suitable for logging tools that spend limited time in the well. However, a longer-term deployment is not possible, e.g., for a seismic tool which may be deployed for weeks or even months at a time.

What is needed is a reliable and robust method for long-term deployments and long-life operations, which uses high-temperature electronics and a high-temperature motor that does not need to be shielded.

SUMMARY OF THE INVENTION

In one embodiment a motor control system is disclosed for deployment in high temperature environments. The motor control system includes a controller; a first half-bridge circuit that includes a first high-side switching element and a first low-side switching element; a second half-bridge circuit that includes a second high-side switching element and a second low-side switching element; and a third half-bridge circuit that includes a third high-side switching element and a third; low-side switching element. The motor controller is arranged to apply a pulse width modulation (PWM) scheme to switch the first half-bridge circuit, second half-bridge circuit, and third half-bridge circuit to power a motor.

In another embodiment a clamping arm apparatus includes a housing, an arm portion, a motor and a control system. The motor is disposed within the housing and rotatably connected to the arm portion. The arm portion is movable in response to rotation of the motor to extend and retract the arm portion from the housing. The control system includes a controller; a first half-bridge circuit that includes a first high-side switching element and a first low-side switching element; a second half-bridge circuit that includes a second high-side switching element and a second low-side switching element; and a third half-bridge circuit that includes a third high-side switching element and a third; low-side switching element. The motor controller applies a pulse width modulation (PWM) scheme to switch the first half-bridge circuit, second half-bridge circuit, and third half-bridge circuit to power the motor.

One advantage is to provide a complete high-temperature motor controller capable of operation in environments with an ambient temperature of greater than 125° C. and up to 230° C. for 1000 hours. The motor and controller may be applied to a seismic tool clamping arm system used in such an environment.

Another advantage is a motor and controller that can be operated over a two wire cable.

Still another advantage is a motor that may be controlled to rotate in both directions, which motor occupies a cylindrical volume no more than about 5.715 cm (2.25 inches) in diameter by about 45.7 cm (18") high and which generates at least 10.2 Newton-meters (7.5 ft-lb) of torque.

Yet another advantage is a control algorithm for the controller that provides the desired performance using a limited selection of parts suitable for high temperature environments.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

A brushless DC (BLDC) motor requires a complex commutation scheme, which necessitates a significant amount of computation. The computational and temperature requirements limit the selection of the electrical components. According to an embodiment of the invention, a field programmable gate array (FPGA) is used to control a BLDC motor at a high ambient temperature for extended periods. As used in this application, high-temperature refers to temperatures greater than 125° C. unless otherwise indicated. In an embodiment, the controller is capable of operating at a temperature up to 230° C. for 1000 hours. In another embodiment, the controller is capable of operating at a temperature up to 225° C. for 1000 hours. The FPGA does not require auxiliary hardware to operate, as is the case with high temperature microcontrollers, making the FPGA more suitable to the control application. In addition, an FPGA is not limited by an instruction set architecture (ISA) as is the case with a microcontroller, and allows for parallel computation.

Figure 1:
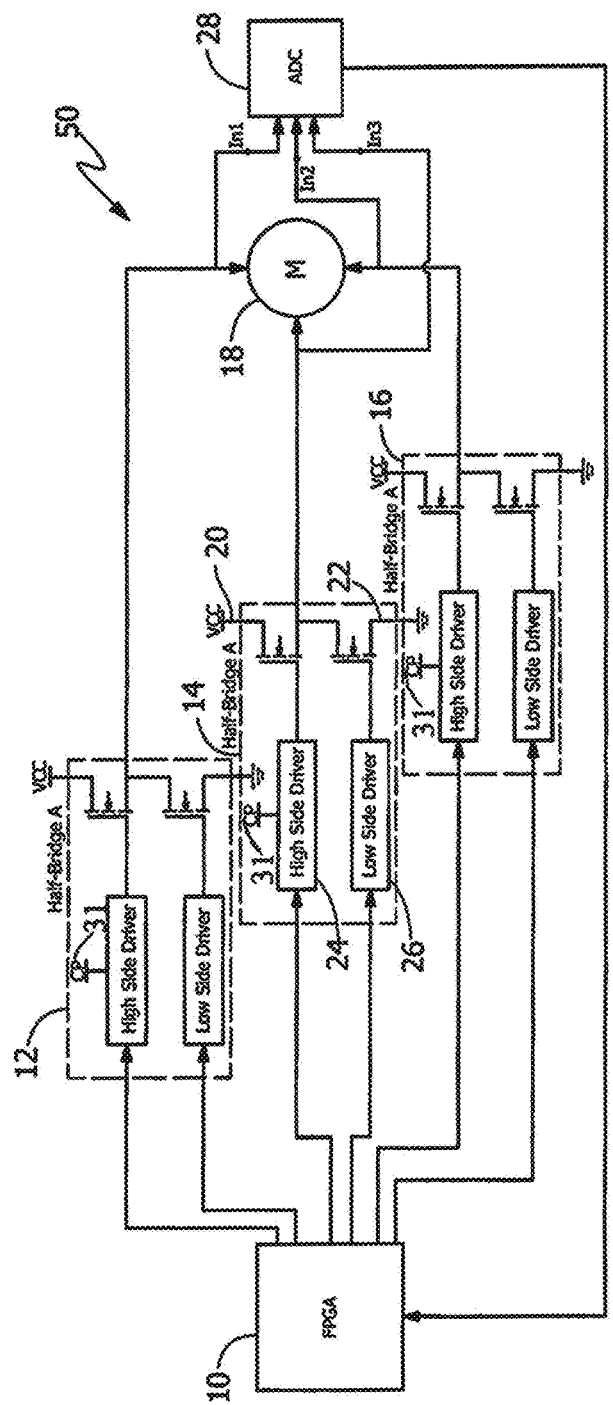
FIG. 1 is an exemplary schematic diagram of a high-temperature motor controller.

FIG. 1 is an exemplary schematic diagram of an embodiment of a high-temperature motor controller (controller) 50 according to the present invention. The controller 50 includes an FPGA 10 that controls operation of three half-bridges 12, 14 and 16. FPGA 10 monitors output voltage of each half-bridge via an analog-to-digital (ADC) converter circuit 28. Half-bridge components 12, 14 and 16 provide the power to drive a BLDC motor 18. Each half-bridge 12, 14 and 16 includes switching elements 20, 22, a high-side driver 24 and a low-side driver 26. High-side driver 24 and low-side driver 26 include supporting electronics (see, e.g., FIGS. 2 & 3) for switching elements 20, 22, which allows FPGA 10 to control switching elements 20, 22.

A charge pump 31 provides a control voltage greater than the rated power supply voltage (VCC) for the operation of high-side driver circuit 24. VCC is the DC voltage that goes to the collector which provides bias power to switching element 20. In one embodiment, switching elements 20, 22 may be a silicon-on-insulator (SOI) metal-oxide-semiconductor field-effect transistor (MOSFET) transistor. For example, the SOI MOSFET may be manufactured by Cissoid S.A. of Belgium. SOI transistors may be characterized by high power ratings up to 230° C., although significant resistance while in the ON state may cause the transistor to dissipate excessive heat when conducting high current. Thus, for high temperature applications, a heat sink may be provided.

Figure 2:
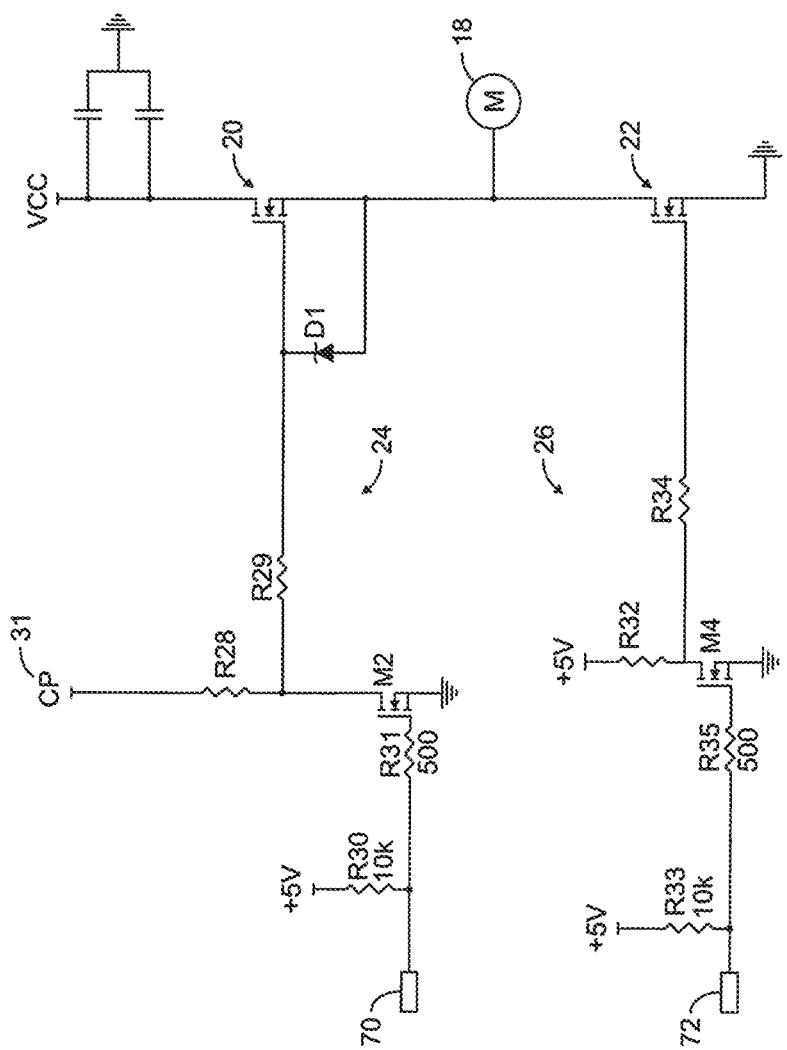
FIG. 2 is an exemplary half bridge circuit.

FIG. 2 is an exemplary schematic of a half bridge circuit 19 according to the present invention. As can be seen in FIG. 2, the half bridge circuit 19 includes a high-side driver circuit 24 connected to transistor 20 of the half bridge circuit 12, 14 or 16. The high-side driver circuit 24 is powered by charge pump 31 which provides a 20 VDC source. FPGA 10 provides an input signal to high-side driver circuit 24 at input terminal 70. Input terminal 70 is connected to a 5V logic supply voltage through a resistor R30. R30 may have a resistance of 10 kΩ or other suitable resistance value. Input terminal 70 is also connected in series with a resistor R31 to a transistor M2. R31 may have a resistance value of 500Ω. Transistor M2 may be a high voltage 80V N-channel small-signal MOSFET with an operating temperature range from −55° C. to 230° C., and drain voltage up to 80V with a typical output current of 300 mA at 230° C. Transistor M2 is connected to charge pump 31 through a resistor R28, with a resistance of 500Ω, and to transistor 20 through another resistor R29 with a resistance of 500Ω.

A low-side driver circuit 26 is connected to transistor 22 of the half bridge circuit 12, 14 or 16. The low-side driver circuit 24 is powered by charge pump 31 which provides a 5 VDC source. FPGA 10 provides an input signal to low-side driver circuit 26 at input terminal 70. Input terminal 72 is connected to a 5V logic supply voltage through a resistor R33. Resistor R33 may have a resistance of 10 kΩ or other suitable resistance value. Input terminal 72 is also connected in series with a resistor R35 to a transistor M4. R35 may have a resistance value of 500Ω. Transistor M4 may be a high voltage 80V N-channel small-signal MOSFET with an operating temperature range from −55° C. to 230° C., and drain voltage up to 80V with a typical output current of 300 mA at 230° C. Transistor M4 is connected to charge pump 31 through a resistor R32, with a resistance of 1000, and to transistor 22 through another resistor R34 with a resistance of 500. Motor 18 is connected to the outputs of transistors 20, 22 respectively.

Figure 3:
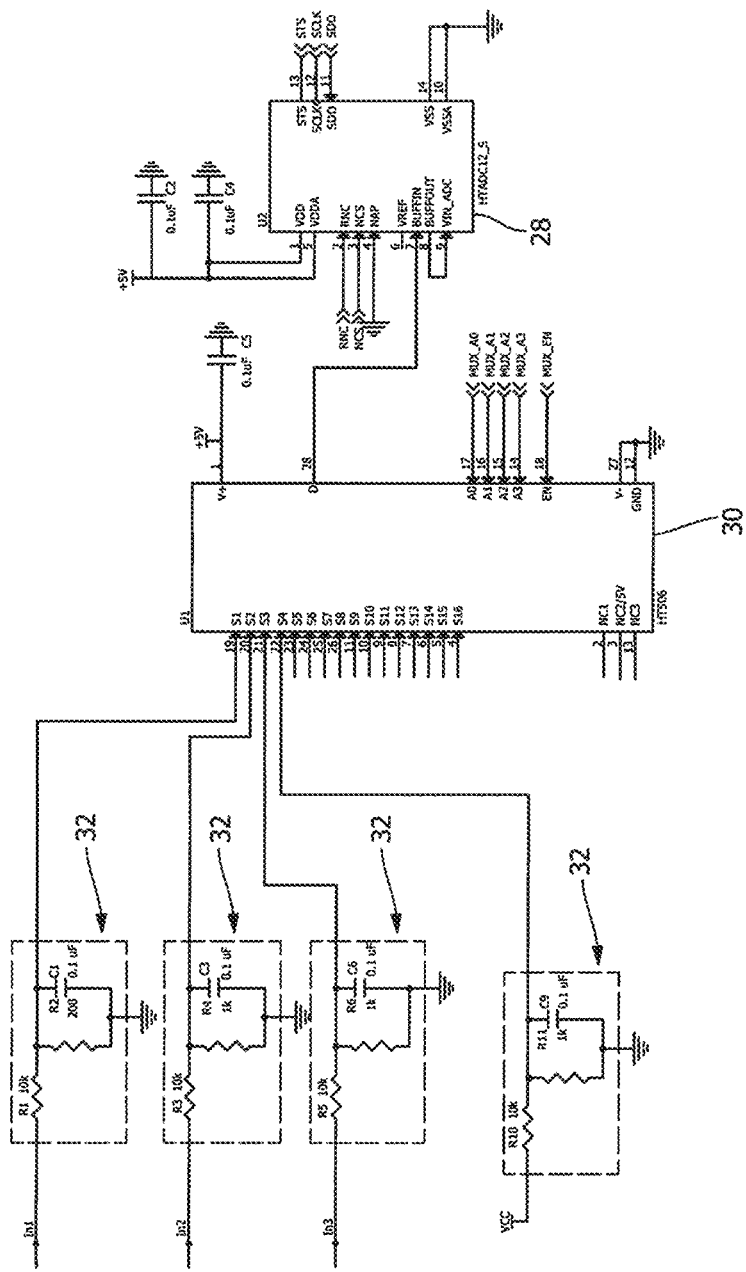
FIG. 3 shows an auxiliary circuit to perform signal conditioning on the back EMF data to the analog-to-digital (ADC) converter for the high-temperature motor controller of FIG. 1.

Referring next to FIG. 3, auxiliary circuits are shown to perform signal conditioning on the back EMF data to the ADC 28. ADC 28 includes a multiplexer circuit 30. Multiplexer circuit 30 includes analog switches, or inputs, S1, S2, S3 and S4 for multiplexing signals to ADC 28. Analog switches S1, S2, and S3 each is connected to a half-bridge 20, 22 through an RC filter circuit 32. RC filter circuit 32 filters the back electromotive force (EMF) and divides the voltage to attenuate the signal to the proper level for digitization by ADC 28. Switch S4 is connected to a 15 VDC source. In the disclosed embodiment capacitors C1, C2, C6 and C9 are rated 1 microfarad, and are connected in parallel with resistors R2, R4, R6 and R11, respectively. Parallel resistors R4, R6 and R11 are rated 1 kΩ, and R2 is rated 200Ω. Series resistors R1, R3, R5 and R10 are rated 10 kΩ and are connected in series with an output connector that connects multiplexer circuit 30 to half-bridges 12, 14, 16. ADC 28 is connected to multiplexer circuit 30 at a terminal D to sense the output voltage of the half-bridges 12, 14, 16.

The six switching elements 20, 22 from each half-bridge 12, 14 and 16, may be attached directly to one or more heatsinks. In one embodiment, the transistors may be equally spaced on one or more heat-sinks, and the average temperature of the heat sink may rise by 1° C. for every 451 joule (J) of resistive heat dissipated by switching elements 20, 22. In one exemplary embodiment, where the power dissipated by switching elements 20, 22 is 20 watts (W) and a maximum temperature differential, or ΔT, of 10° C., the allowable continuous run time of the system is approximately four minutes.

In an embodiment, the controller may be used to operate a clamping mechanism for a seismic sensor. In this application, the motor operates periodically and prolonged continuous operation is not required. To mitigate the resistance heat buildup from the high-temperature power transistors 20, 22, a heat sink may be used to store heat sufficient to prevent the transistors from overheating. In one embodiment the heat sink may be comprised of a brass block with dimensions 22.86 cm×5.08 cm×1.27 cm (9"×2"×0.5"), and 1.225 kg (2.7 lb). Brass is a preferred material for the heat sink, due to its thermal properties, and because brass is easy to machine. Other heat sink materials having comparable thermal properties and machinability may also be used, e.g., copper, bronze and aluminum.

Referring again to FIG. 1, a control algorithm is implemented in FPGA 10 to provide the input signals to half-bridge drivers 20, 22, in order to operate the BLDC motor 18. Commutation is achieved by applying drive pulses to each of the half-bridge drivers in such a way as to create a rotating magnetic field in the motor which applies torque to the motor shaft. The control algorithm includes six discrete steps, or phase indexes, in one revolution of the BLDC motor 18. Each phase index corresponds to driving each of the three motor windings either to positive voltage, ground, or left unconnected. The order in which these voltages are applied to the motor windings determines the direction of the magnetic field generated within motor 18. FPGA 10 accesses a look-up table programmed with the correct steps required to create a rotating magnetic field. FPGA 10 drives the motor windings in this order via half-bridge driver circuits 24, 26.

The timing that each phase voltage is applied to the windings of motor 18 determines the speed at which the motor shaft turns. In a conventional BLDC control scheme, the rotor position may be sensed directly via Hall effects sensors, and the next phase step can be instantly applied at the optimal timing for the greatest efficiency. However, as the high-temperature motor 18 does not include Hall-effect sensors, a more complex control algorithm is applied to motor 18 via FPGA 10 to electronically control both the speed and torque of the motor.

In order to implement such a control algorithm and still meet the size constraints of FPGA 10, a constant speed algorithm may be implemented, to significantly reduce the size of controller 50. A constant speed algorithm commutes the motor 18 at a predetermined rate without adjusting to match varying loads. From a stationary position, motor 18 is provided with current sufficient to ensure a predetermined torque output, and motor speed slowly increased to a constant operating speed. By using voltage feedback from the ADC, power output to motor 18 may be adjusted to match the power requirements of the load. Controller 50 applies a switched power supply pulse width modulation (PWM) scheme to control the voltage available to the motor windings. The PWM duty cycle is dynamically adjusted by FPGA 10, to increase or decrease the torque generated by motor 18. In addition, the voltage feedback may be used to detect a stall condition, at which point the control algorithm will stop motor commutation, and the controller will determine the remedial commutation sequence, which may vary by application. Such responses may be pre-programmed into FPGA 10, and may be customized to fit different applications.

Figure 4:
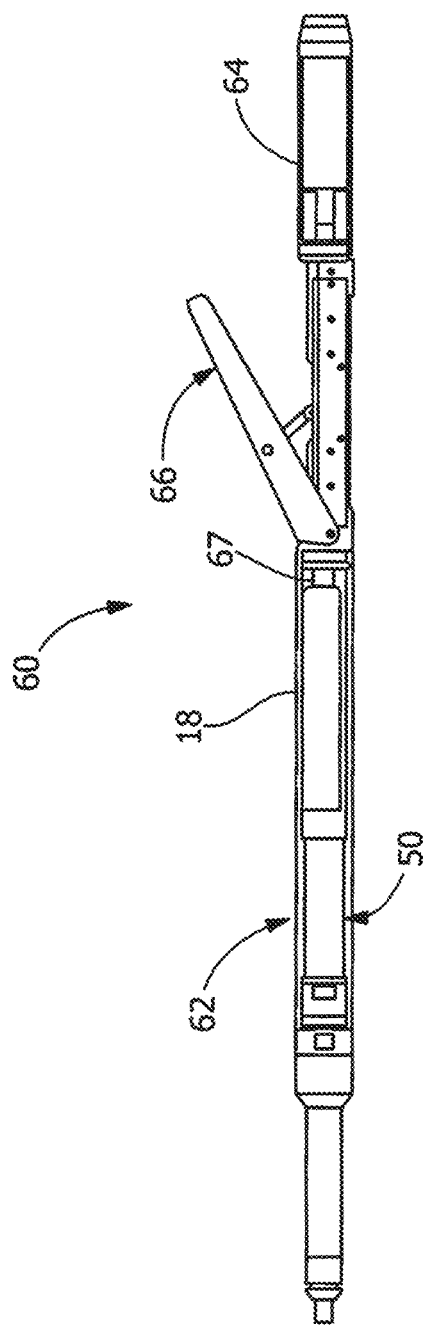
FIG. 4 is an exemplary clamping arm for a seismic tool or sensor.

FIG. 4 illustrates an embodiment of a tool 60 according to the present invention. In an embodiment, the tool 60 may be a seismic tool used in a downhole field. As can be seen in FIG. 4, the tool 60 includes a housing 62 and a package 64 located within the housing 62. The package 64 may be, but is not limited to a sensor, hydraulic pump, actuator, drill, an/or sampler. In an embodiment, the sensor may be a seismic, acoustic, pressure, temperature, chemical, camera, or other environmental measurement device. The tool 60 further includes a protrusion or clamping arm 66 pivotally attached to the housing 62 and motor 18 and motor controller 50 disposed and arranged within a housing 62. The motor 18 is coupled to the clamping arm 66 by a coupling 67. When initiated by the controller 50 and motor 18 may be operated to extend, rotate or otherwise manipulate the coupling 67 to extend the clamping arm 66. In an embodiment, the coupling 67 may be used to extend and retract the clamping arm 66. In an embodiment, the coupling may be a screw that is rotated in clockwise and counterclockwise directions by the motor 18 to extend and retract, respectively, the clamping arm 66.

The direction of rotation of motor 18 is determined based on the voltage being applied to the system. If the voltage is lower than a certain level motor 18 rotates clockwise; otherwise motor 18 rotates counter-clockwise. To deploy or stow clamping arm 66 the controller 50 will step through a discrete number of steps during which the controller 50 will operate the motor 18 in a constant torque and constant speed mode. The torque is increased and speed is decreased between each step to achieve desired clamping force. Each step consists of startup sequence, normal operation and stall condition. During the startup sequence, the motor 18 is internally aligned and then accelerated to desired speed over a period of 500 ms. While in normal operation mode, the motor 18 maintains the constant output torque and speed until a stall condition is detected and then the controller 50 moves to the next step until desired force is achieved or stops the operation pending power down or reset.

Figure 5:
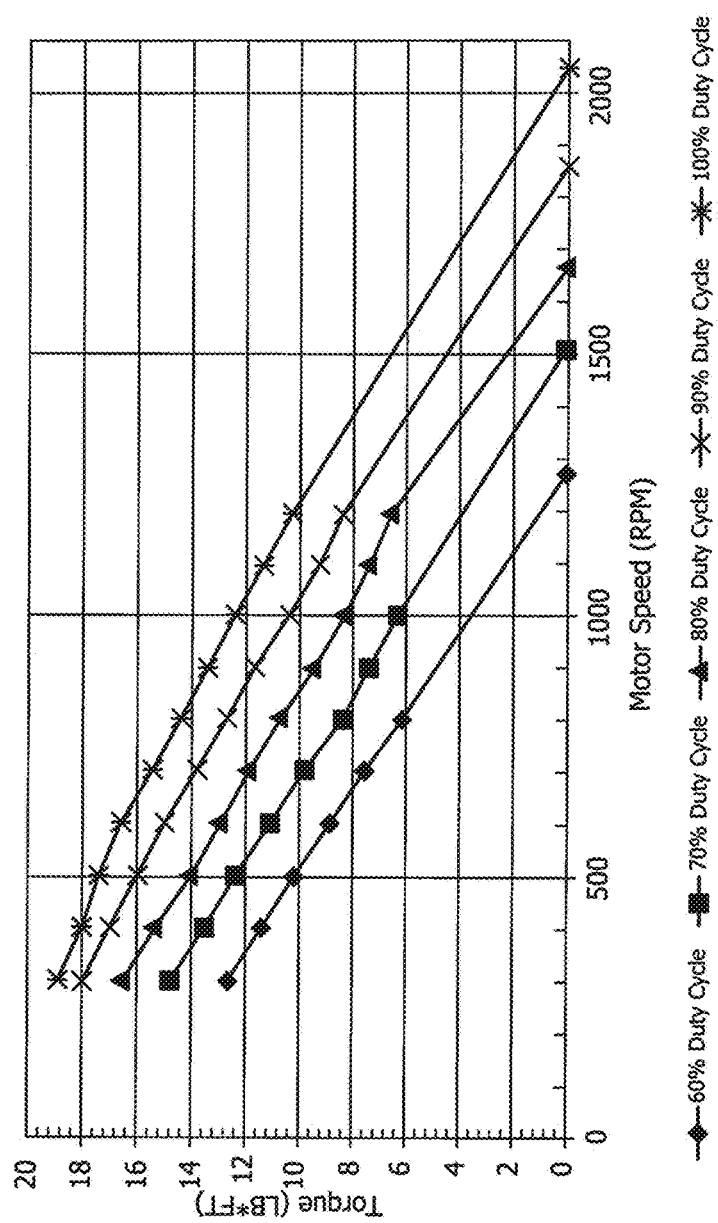
FIG. 5 is a graph of test results for a brushless DC motor at PWM duty cycle ranges from 60% to 100%.

Motor controller 50 operates BLDC motor 18 using a sensorless control algorithm. In one embodiment, BLDC motor 18 and motor controller 50 may generate 18.8 ft·lb of torque, which exceeds the torque necessary to clamp a tool or sensing system in a borehole, and which is suitable for periodic operation. PWM duty cycles were tested at between 60% and 100% with torque/speed results as shown in FIG. 5. Lower PWM duty cycles may also be useful as well.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A motor controller for deployment in high temperature environments, comprising:
    a first half-bridge circuit comprising a first high-side switching element and a first low-side switching element;
    a second half-bridge circuit comprising a second high-side switching element and a second low-side switching element;
    a third half-bridge circuit comprising a third high-side switching element and a third; low-side switching element;
    wherein the controller is arranged to apply a pulse width modulation (PWM) scheme to switch the first half-bridge circuit, second half-bridge circuit, and third half-bridge circuit to power a motor; and
    wherein the controller is configured to detect a stall condition of the motor in response to a voltage feedback signal; and to stop commutation of the motor in response to detecting the stall condition; and
    a charge pump to provide a control voltage to the controller that is greater than a rated power supply voltage (VCC) for operation of the high-side switching element.

2. The motor controller of claim 1, wherein the controller is configured to implement a constant speed algorithm, the constant speed algorithm configured to commute the motor at a predetermined rotational speed.

3. The motor controller of claim 1, wherein the controller is configured to switch the first half-bridge circuit, the second half-bridge circuit and the third half-bridge circuit in a predetermined sequence to provide a current sufficient to ensure a predetermined torque output.

4. The motor controller of claim 3, wherein the controller is configured to switch the first half-bridge circuit, the second half-bridge circuit and the third half-bridge circuit in a predetermined sequence to slowly increase a motor speed to a constant operating speed.

5. The motor controller of claim 1, further comprising an analog-to-digital converter (ADC), wherein the ADC provides a voltage feedback signal to the controller, and the controller adjusts an output power to the motor in response to the voltage feedback signal.

6. The motor controller of claim 1, wherein the controller dynamically adjusts a PWM duty cycle to increase or decrease a torque generated by the motor.

7. The motor controller of claim 2, wherein the constant speed algorithm determines a remedial commutation sequence to apply to the motor in response to the voltage feedback signal.

8. The motor controller of claim 7, wherein the voltage feedback signal is processed by the controller to determine if the stall condition exists, and in response to determining that the stall condition exists, the controller stops commutation of the motor.

9. The motor controller of claim 1, wherein the motor comprises a Brushless DC motor.

10. The motor controller of claim 1, wherein the controller comprises a field programmable array.

11. The motor controller of claim 1, wherein at least one of the switching elements comprises a silicon-on-insulator (SOI) metal-oxide-semiconductor field-effect transistor (MOSFET) transistor.

12. A tool comprising:
a housing;
a protrusion pivotally attached to the housing;
a motor and a controller disposed within the housing; and
a coupling connected between the motor and protrusion;
wherein the protrusion is pivoted away from the housing in response to operation of the motor; and
wherein the controller comprises:
  a first half-bridge circuit comprising a first high-side switching element and a first low-side switching element;
  a second half-bridge circuit comprising a second high-side switching element and a second low-side switching element; and
  a third half-bridge circuit comprising a third high-side switching element and a third; low-side switching element;

wherein the controller is arranged to apply a pulse width modulation (PWM) scheme to switch the first half-bridge circuit, second half-bridge circuit, and third half-bridge circuit to power the motor; and wherein the controller is configured to detect a stall condition of the motor in response to a voltage feedback signal; and to stop commutation of the motor in response to detecting the stall condition; and a charge pump to provide a control voltage to the controller that is greater than a rated power supply voltage (VCC) for operation of the high-side switching element.

13. The tool of claim 12, wherein the protrusion is pivoted away from the housing in response to operation of the motor by rotation of the coupling in response to rotation of the motor.

14. The tool of claim 12, wherein the controller is configured to implement a constant speed algorithm, the constant speed algorithm configured to commute the motor at a predetermined rotational speed.

15. The tool of claim 12, wherein the controller is configured to switch the first half-bridge circuit, the second half-bridge circuit and the third half-bridge circuit in a predetermined sequence to provide a current sufficient to ensure a predetermined torque output.

16. The tool of claim 15, wherein the controller is configured to switch the first half-bridge circuit, the second half-bridge circuit and the third half-bridge circuit in a predetermined sequence to slowly increase a motor speed to a constant operating speed.

17. The tool of claim 12, further comprising an analog-to-digital converter, wherein the analog-to-digital converter provides the voltage feedback signal to the controller, and the controller adjusts an output power to the motor in response to the voltage feedback signal.

18. The tool of claim 12, wherein the motor comprises a brushless DC motor.

19. The tool of claim 12, wherein the controller comprises a field programmable array.

* * * * *

UNITED STATES PATENT AND TRADEMARK OFFICE
CERTIFICATE OF CORRECTION

PATENT NO. : 9,654,035 B1
APPLICATION NO. : 14/502821
DATED : May 16, 2017
INVENTOR(S) : Grzegorz Cieslewski et al.

Page 1 of 1

It is certified that error appears in the above-identified patent and that said Letters Patent is hereby corrected as shown below:

On the Title Page

In Column 1, item "(72) Inventors", Line 5, please delete the word "Eckert" and insert the word --Echert--.

Signed and Sealed this
Third Day of October, 2017

Joseph Matal
*Performing the Functions and Duties of the*
*Under Secretary of Commerce for Intellectual Property and*
*Director of the United States Patent and Trademark Office*